United States Patent
Jang et al.

(10) Patent No.: US 10,767,044 B2
(45) Date of Patent: Sep. 8, 2020

(54) IONIZING RADIATION RESISTANT POLYCARBONATE RESIN COMPOSITION AND MOLDED ARTICLE CONTAINING SAME

(71) Applicant: LOTTE ADVANCED MATERIALS CO., LTD., Yeosu-si (KR)

(72) Inventors: Hyun Hye Jang, Uiwang-si (KR); Chang Heon Lee, Uiwang-si (KR); Woo Suk Chei, Uiwang-si (KR); O Sung Kwon, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 11 days.

(21) Appl. No.: 15/770,538

(22) PCT Filed: Oct. 12, 2016

(86) PCT No.: PCT/KR2016/011415
§ 371 (c)(1),
(2) Date: Apr. 24, 2018

(87) PCT Pub. No.: WO2017/073929
PCT Pub. Date: May 4, 2017

(65) Prior Publication Data
US 2019/0062550 A1 Feb. 28, 2019

(30) Foreign Application Priority Data

Oct. 27, 2015 (KR) .................. 10-2015-0149765

(51) Int. Cl.
*C08L 69/00* (2006.01)
(52) U.S. Cl.
CPC .......... *C08L 69/00* (2013.01); *C08L 2201/08* (2013.01); *C08L 2203/02* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 3,280,078 A | * | 10/1966 | Fritz | .................. C08G 64/0291 528/370 |
| 3,301,825 A | * | 1/1967 | Fritz | ...................... C08G 63/08 528/354 |
| 4,760,107 A | | 7/1988 | Nelson | |
| 4,826,918 A | * | 5/1989 | Kress | ...................... C08L 69/00 525/67 |
| 4,900,797 A | * | 2/1990 | Leitz | ...................... C08L 69/00 524/537 |
| 4,908,422 A | * | 3/1990 | Leitz | ...................... C08L 67/02 525/468 |
| 6,231,965 B1 | | 5/2001 | Takemura et al. | |
| 9,650,514 B2 | | 5/2017 | Lu et al. | |
| 9,777,153 B2 | | 10/2017 | Hong et al. | |
| 2007/0117957 A1 | | 5/2007 | Mullen | |
| 2007/0293600 A1 | * | 12/2007 | Tamura | ................... A61L 29/06 523/136 |

FOREIGN PATENT DOCUMENTS

| | | |
|---|---|---|
| CN | 101087848 A | 12/2007 |
| CN | 103547629 A | 1/2014 |
| CN | 104302701 A | 1/2015 |
| DE | 1545117 * | 11/1969 |
| DE | 1545116 * | 3/1970 |
| DE | 4227999 * | 3/1994 |
| EP | 0272417 A2 | 6/1988 |
| EP | 0911367 A1 | 4/1994 |
| JP | 09-059504 A | 3/1997 |
| JP | 2003-171546 A | 6/2003 |
| JP | 2012-0207230 A | 10/2012 |
| KR | 10-2000-0022089 A | 4/2000 |
| KR | 10-2012-0077665 A | 7/2012 |
| KR | 10-2015-0059666 A | 6/2015 |
| WO | 2017/073929 A1 | 5/2017 |

OTHER PUBLICATIONS

International Search Report in counterpart International Application No. PCT/KR2016/011415 dated Jan. 18, 2017, pp. 1-4.

* cited by examiner

*Primary Examiner* — David J Buttner

(74) *Attorney, Agent, or Firm* — Additon, Higgins & Pendleton, P.A.

(57) ABSTRACT

A polycarbonate resin composition of the present invention comprises: a polycarbonate resin; and a polycarbonate polyol comprising a terminal hydroxyl group and a repeat unit represented by Formula 1. The polycarbonate resin composition exhibits good properties in terms of color, impact resistance, stiffness and the like even after irradiation with ionizing radiation.

16 Claims, No Drawings

IONIZING RADIATION RESISTANT POLYCARBONATE RESIN COMPOSITION AND MOLDED ARTICLE CONTAINING SAME

CROSS-REFERENCE TO RELATED APPLICATIONS

This application claims priority to and the benefit of International Application No. PCT/KR2016/011415, filed Oct. 12, 2016, which published as WO 2017/073929 on May 4, 2017; and Korean Patent Application No. 10-2015-0149765, filed in the Korean Intellectual Property Office on Oct. 27, 2015, the entire disclosure of each of which is incorporated herein by reference.

TECHNICAL FIELD

The present invention relates to an ionizing radiation-resistant polycarbonate resin composition and a molded article including the same. More particularly, the present invention relates to an ionizing radiation-resistant polycarbonate resin composition which exhibits good properties in terms of color, impact resistance, stiffness and the like even after irradiation with ionizing radiation, and a molded article including the same.

BACKGROUND ART

Polycarbonate resins are broadly used in various fields due to good mechanical and thermal properties thereof. Particularly, polycarbonate resins have good properties in terms of transparency, hygienic properties, rigidity, and heat resistance, and are broadly used as materials for medical supplies for medical devices, surgical instruments, and the like. Such medical products are required to be completely sterilized, and examples of such sterilization methods include contact treatment with sterilized gas such as ethylene oxide, heat treatment in an autoclave, ionizing radiation treatment with gamma radiation, electron beams and X-rays, and the like. Among these methods, contact treatment with ethylene oxide is undesirable due to toxicity and instability of ethylene oxide, and environmental problems caused by waste disposal. In addition, heat treatment in the autoclave can cause deterioration of the polycarbonate resin during treatment at high temperature and requires high energy costs and a drying process due to moisture remaining on a treated part. Therefore, sterilization treatment by irradiation with ionizing radiation, which can be performed at low temperature and is relatively economical, is typically used in the art.

Generally, polycarbonate resins suffer from yellowing and deterioration in physical properties when irradiated with ionizing radiation. To overcome these problems, there have been proposed a method of blending a polycarbonate resin with other polymers, a method of adding various additives to a polycarbonate resin, and a method of copolymerizing a polycarbonate resin. However, such methods have failed to completely solve the problems such as yellowing and deterioration in physical properties.

Therefore, there is a need for a polycarbonate resin composition which allows liquid level or color of contents such as chemicals or blood in a molded article to be easily distinguished and exhibits good properties in terms of impact resistance and stiffness even after being irradiated with ionizing radiation.

The background technique of the present invention is disclosed in Korean Patent Publication No. 10-2012-0077665.

DISCLOSURE

Technical Problem

It is an aspect of the present invention to provide an ionizing radiation-resistant polycarbonate resin composition which exhibits good properties in terms of color, impact resistance, stiffness and the like even after irradiation with ionizing radiation, and a molded article including the same.

The above and other objects of the present invention can be achieved by the present invention described below.

Technical Solution

One aspect of the present invention relates to a polycarbonate resin composition. The polycarbonate resin composition includes: a polycarbonate resin; and a polycarbonate polyol containing a terminal hydroxyl group and a repeat unit represented by Formula 1:

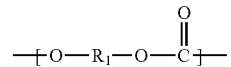

[Formula 1]

wherein $R_1$ is a $C_1$ to $C_{15}$ linear alkylene group, a $C_3$ to $C_{15}$ branched alkylene group, or a $C_5$ to $C_{15}$ cyclic alkylene group.

In exemplary embodiments, the polycarbonate polyol may be present in an amount of about 0.1 parts by weight to about 1.5 parts by weight relative to about 100 parts by weight of the polycarbonate resin.

In exemplary embodiments, the polycarbonate polyol may contain: a terminal hydroxyl group; a repeat unit represented by Formula 1a; and a repeat unit represented by Formula 1b:

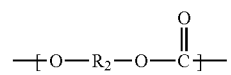

[Formula 1a]

wherein $R_2$ is a $C_1$ to $C_4$ linear alkylene group or a $C_3$ to $C_4$ branched alkylene group,

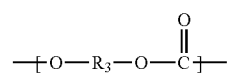

[Formula 1b]

wherein $R_3$ is a $C_5$ to $C_{15}$ linear alkylene group, a $C_5$ to $C_{15}$ branched alkylene group, or a $C_5$ to $C_{15}$ cyclic alkylene group.

In exemplary embodiments, the repeat unit represented by Formula 1a may be present in an amount of about 1 mol % to about 99 mol % based on the total mole number of the repeat units represented by Formula 1a and Formula 1b, respectively, and the repeat unit represented by Formula 1b may be present in an amount of about 1 mol % to about 99 mol % based on the total mole number of the repeat units represented by Formula 1a and Formula 1b, respectively.

In exemplary embodiments, the polycarbonate polyol may have a number average molecular weight of about 1,000 g/mol to about 5,000 g/mol.

In exemplary embodiments, the polycarbonate resin composition may further include at least one of a polyalkylene glycol, an epoxy ester compound represented by Formula 2, and an anthraquinone colorant:

[Formula 2]

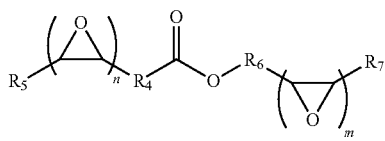

wherein $R_4$ and $R_6$ are each independently a $C_1$ to $C_{10}$ hydrocarbon group, $R_5$ and $R_7$ are each independently a hydrogen atom or a $C_1$ to $C_{10}$ hydrocarbon group, m and n are 0 or 1, and m+n is 1 or 2, $R_4$, $R_5$, $R_6$, and $R_7$ being connected to one another to form a ring or not being connected to one another.

In exemplary embodiments, based on about 100 parts by weight of the polycarbonate resin, the polyalkylene glycol may be present in an amount of about 0.1 parts by weight to about 1.5 parts by weight, the epoxy ester compound may be present in an amount of about 0.001 parts by weight to about 3 parts by weight, and the anthraquinone colorant may be present in an amount of about 0.0001 parts by weight to about 0.002 parts by weight.

In exemplary embodiments, the anthraquinone colorant may include a red anthraquinone colorant and a violet anthraquinone colorant in a weight ratio of about 1:1 to about 1:2.

In exemplary embodiments, the polycarbonate resin composition may have a yellow index (YI) of about −10 to about 10, as measured on an about 3.2 mm thick specimen in accordance with ASTM D1925 after irradiation with γ-rays at 25 kGy and leaving the specimen for 7 days.

In exemplary embodiments, the polycarbonate resin composition may have a yellow index difference ΔYI of about 30 or less, as measured on an about 3.2 mm thick specimen and calculated according to Equation 1:

$$\Delta YI = YI_1 - YI_0 \quad \text{[Equation 1]}$$

wherein $YI_0$ is a yellow index (YI) of the specimen, as measured in accordance with ASTM D1925 before irradiation with γ-rays, and $YI_1$ is a yellow index (YI) of the specimen, as measured in accordance with ASTM D1925 after irradiation with γ-rays at 25 kGy and leaving the specimen for 7 days.

In exemplary embodiments, the polycarbonate resin composition may have a notched Izod impact strength of about 90 kgf·cm/cm or more, as measured on a 1/8" thick specimen in accordance with ASTM D256 after irradiation with γ-rays at 25 kGy and leaving the specimen for 7 days.

In exemplary embodiments, the polycarbonate resin composition may have a tensile strength of about 620 MPa to about 700 MPa, as measured on a 3.2 mm thick specimen in accordance with ASTM D638 after irradiation with γ-rays at 25 kGy and leaving the specimen for 7 days, and a flexural strength of about 910 MPa to about 960 MPa, as measured on a 3.2 mm thick specimen in accordance with ASTM D790 after irradiation with γ-rays at 25 kGy and leaving the specimen for 7 days.

Another aspect of the present invention relates to a molded article formed of the polycarbonate resin composition set forth above.

In exemplary embodiments, the molded article may be an ionizing radiation-resistant medical appliance.

Advantageous Effects

The present invention provides an ionizing radiation-resistant polycarbonate resin composition which exhibits good properties in terms of color, impact resistance, stiffness and the like even after irradiation with ionizing radiation, and a molded article including the same.

BEST MODE

Hereinafter, embodiments of the present invention will be described in detail.

A polycarbonate resin composition according to the present invention has ionizing radiation-resistance, and includes: (A) a polycarbonate resin; and (B) a polycarbonate polyol.

(A) Polycarbonate Resin

The polycarbonate resin may include any suitable polycarbonate resin such as an aromatic polycarbonate resin used in a typical polycarbonate resin composition. The polycarbonate resin may be prepared by a typical method, for example, by reacting a dihydric phenol compound (aromatic diol compound) with phosgene in the presence of a molecular weight regulator and a catalyst, or through transesterification of a dihydric phenol compound and a carbonate precursor such as diphenyl carbonate.

In preparation of the polycarbonate resin, the dihydric phenol compound may be a bisphenol compound, for example, 2,2-bis(4-hydroxyphenyl)propane (hereinafter, "bisphenol A"). Here, the bisphenol A may be partially or completely replaced by other dihydric phenol compounds. Examples of other dihydric phenol compounds may include hydroquinone, 4,4'-biphenol, bis(4-hydroxyphenyl)methane, 1,1-bis(4-hydroxyphenyl)cyclohexane, 2,2-bis(3,5-dimethyl-4-hydroxyphenyl)propane, 2,2-bis(3-methyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, a halogenated bisphenol, such as bis(4-hydroxyphenyl)ether or 2,2-bis(3,5-dibromo-4-hydroxyphenyl)propane, and the like. However, the dihydric phenol compound that can be used for preparation of the polycarbonate resin is not limited thereto, and the polycarbonate resin may be prepared using any dihydric phenol compound.

In addition, the polycarbonate resin may be a homopolymer obtained using one dihydric phenol compound, a copolymer obtained using at least two dihydric phenol compounds, or a mixture thereof.

Furthermore, the polycarbonate resin may be a linear polycarbonate resin, a branched polycarbonate resin, or a polyester carbonate copolymer resin. The polycarbonate resin included in the polycarbonate resin composition according to the present invention may include linear polycarbonate resins, branched polycarbonate resins, and polyester carbonate copolymer resins, without being limited thereto.

For example, the linear polycarbonate resin may be a bisphenol A polycarbonate resin, and the branched polycarbonate resin may be prepared by, for example, reacting a polyfunctional aromatic compound such as trimellitic anhydride or trimellitic acid with a dihydric phenol compound and a carbonate precursor. The polyester carbonate copolymer resin may be prepared by, for example, reacting a bifunctional carboxylic acid with a dihydric phenol and a carbonate precursor. In addition, the polycarbonate resin may include typical linear polycarbonate resins, branched polycarbonate resins, and polyester carbonate copolymer resins without limitation.

In some embodiments, the polycarbonate resin may include a terminal modified polycarbonate resin having a tert-butylphenoxy group at a terminal thereof. The terminal modified polycarbonate resin may be prepared by a typical method for preparing the polycarbonate resin except that tert-butylphenol is added in the preparation of the polycarbonate resin. When the terminal modified polycarbonate resin is included in the composition, the tert-butylphenoxy group may be present in an amount of about 0.1 mol % to about 80 mol %, for example, about 20 mol % to about 60 mol %, in the polycarbonate resin. Within this range, the polycarbonate resin composition can exhibit further enhanced properties in terms of ionizing radiation resistance, impact resistance, and the like.

In some embodiments, the polycarbonate resin may have a weight average molecular weight (Mw) of about 10,000 g/mol to about 200,000 g/mol, for example, about 15,000 g/mol to about 80,000 g/mol, as measured by gel permeation chromatography (GPC), without being limited thereto.

(B) Polycarbonate Polyol

The polycarbonate polyol according to the present invention can reduce discoloration of the polycarbonate resin composition and deterioration in properties of the composition, such as impact resistance, stiffness and the like, after irradiation with ionizing radiation and may include: a hydroxyl group at (both) terminals thereof; and a repeat unit represented by Formula 1.

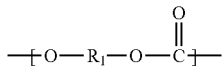

[Formula 1]

In Formula 1, $R_1$ is a $C_1$ to $C_{15}$ linear alkylene group, a $C_3$ to $C_{15}$ branched alkylene group, or a $C_5$ to $C_{15}$ cyclic alkylene group. For example, $R_1$ may be a methylene group, an ethylene group, an n-propylene group, an isopropylene group, an n-butylene group, an isobutylene group, an n-hexylene group, an n-heptylene group, a cyclohexylene group, or a combination thereof, without being limited thereto.

In some embodiments, the polycarbonate polyol may include a terminal hydroxyl group, a repeat unit represented by Formula 1a, and a repeat unit represented by Formula 1b.

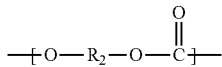

[Formula 1a]

In Formula 1a, $R_2$ is a $C_1$ to $C_4$ linear alkylene group or a $C_3$ to $C_4$ branched alkylene group. For example, $R_2$ may be a methylene group, an ethylene group, an n-propylene group, an isopropylene group, an n-butylene group, or an isobutylene group, without being limited thereto.

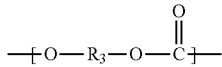

[Formula 1b]

In Formula 1b, $R_3$ is a $C_5$ to $C_{15}$ linear alkylene group, a $C_5$ to $C_{15}$ branched alkylene group, or a $C_5$ to $C_{15}$ cyclic alkylene group. For example, $R_3$ may be an n-hexylene group, an n-heptylene group, or a cyclohexylene group, without being limited thereto.

In some embodiments, the repeat unit represented by Formula 1a may be present in an amount of about 1 mol % to about 99 mol %, for example, about 10 mol % to about 90 mol %, based on the total mole number of the repeat units represented by Formula 1a and Formula 1b, respectively, and the repeat unit represented by Formula 1b may be present in an amount of about 1 mol % to about 99 mol %, for example, about 10 mol % to about 90 mol %, based on the total mole number of the repeat units represented by Formula 1a and Formula 1b, respectively. Within this range, the polycarbonate resin composition can have good properties in terms of impact resistance, transparency, and the like.

In some embodiments, the polycarbonate polyol may be prepared by a typical method known in the art, for example, by reacting a $C_1$ to $C_{15}$ linear, branched or cyclic alkanediol compound with a diaryl carbonate such as diphenyl carbonate.

In some embodiments, the polycarbonate polyol may have a number average molecular weight (Mn) of about 1,000 g/mol to about 5,000 g/mol, for example, about 1,000 g/mol to about 3,000 g/mol, as measured by gel permeation chromatography (GPC). Within this range, the polycarbonate resin composition can exhibit good properties in terms of ionizing radiation resistance, impact resistance, stiffness, and the like.

In some embodiments, the polycarbonate polyol may be present in an amount of about 0.1 parts by weight to about 1.5 parts by weight, for example, about 0.2 parts by weight to about 1.3 parts by weight, relative to about 100 parts by weight of the polycarbonate resin. Within this range, the polycarbonate resin composition can exhibit good properties in terms of color, impact resistance, stiffness and the like after irradiation with ionizing radiation.

The polycarbonate resin composition according to the present invention may further include: (C) a polyalkylene glycol, (D) an epoxy ester compound, (E) an anthraquinone colorant, and combinations thereof.

(C) Polyalkylene Glycol

The polyalkylene glycol may include polyalkylene glycol, ethers of polyalkylene glycol, and/or esters of polyalkylene glycol. The polyalkylene glycol may include any polyols used in a typical ionizing radiation resistant composition. Examples of the polyols may include polyethylene glycol, polyethylene glycol methyl ether, polyethylene glycol dimethyl ether, polyethylene glycol dodecyl ether, polyethylene glycol benzyl ether, polyethylene glycol dibenzyl ether, polyethylene glycol-4-nonylphenylether, polypropylene glycol, polypropylene glycol methyl ether, polypropylene glycol dimethyl ether, polypropylene glycol dodecyl ether, polypropylene glycol benzyl ether, polypropylene glycol dibenzyl ether, polypropylene glycol-4-nonylphenylether, polytetramethylene glycol, polyethylene glycol diacetate, polyethylene glycol acetate propionate, polyethylene glycol dibutyrate, polyethylene glycol distearate, polyethylene glycol dibenzoate, polyethylene glycol di-2,6-dimethyl benzoate, polyethylene glycol di-p-tert-butyl benzoate, polyethylene glycol dicaprylate, polypropylene glycol diacetate, polypropylene glycol acetate propionate, polypropylene glycol dibutyrate, polypropylene glycol distearate, polypropylene glycol dibenzoate, polypropylene glycol di-2,6-dimethyl benzoate, polypropylene glycol di-p-tert-butyl benzoate, and polypropylene glycol dicaprylate, without being limited thereto. These may be used alone or as a mixture thereof.

In some embodiments, the polyalkylene glycol may have a number average molecular weight (Mn) of about 1,000 g/mol to about 5,000 g/mol, for example, about 1,500 g/mol to about 3,000 g/mol, as measured by gel permeation chromatography (GPC). Within this range, the polycarbonate resin composition can exhibit good properties in terms of impact resistance, discoloration resistance, and the like, after irradiation with ionizing radiation.

In some embodiments, when the polyalkylene glycol is used, the polyalkylene glycol may be present in an amount of about 0.1 parts by weight to about 1 part by weight, for example, about 0.2 parts by weight to about 0.9 parts by weight, relative to about 100 parts by weight of the polycarbonate resin. Within this range, the polycarbonate resin composition can exhibit good properties in terms of impact resistance, discoloration resistance, and the like, after irradiation with ionizing radiation.

In addition, when the polyalkylene glycol is used, the total amount (B+C) of the polycarbonate polyol and the polyalkylene glycol may range from about 0.2 parts by weight to 2 parts by weight, for example, from 0.4 parts by weight to 1.5 parts by weight, relative to about 100 parts by weight of the polycarbonate resin (A). Within this range, the polycarbonate resin composition can exhibit good properties in terms of color, impact resistance, stiffness, and the like.

(D) Epoxy Ester Compound

The epoxy ester compound serves to improve ionizing radiation resistance of the polycarbonate resin composition without deterioration in hydrolysis resistance and contains an ester group and an epoxy group. For example, the epoxy ester compound may include a compound represented by Formula 2.

[Formula 2]

In Formula 2, $R_4$ and $R_6$ are each independently a $C_1$ to $C_{10}$ hydrocarbon group; $R_5$ and $R_7$ are each independently a hydrogen atom or a $C_1$ to $C_{10}$ hydrocarbon group; m and n are 0 or 1; and m+n is 1 or 2, wherein $R_4$, $R_5$, $R_6$, and $R_7$ may be connected to one another to form a ring or may not be connected to one another.

Examples of the epoxy ester compound may include compounds represented by Formulae 2a to 2c, without being limited thereto.

[Formula 2a]

[Formula 2b]

[Formula 2c]

In some embodiments, when the epoxy ester compound is used, the epoxy ester compound may be present in an amount of about 0.001 parts by weight to about 3 parts by weight, for example, about 0.01 parts by weight to about 2 parts by weight, relative to about 100 parts by weight of the polycarbonate resin. Within this range, the polycarbonate resin composition can exhibit good properties in terms of discoloration resistance without deterioration in hydrolysis resistance and thermal stability even after irradiation with ionizing radiation.

(E) Anthraquinone Colorant

The anthraquinone colorant allows the polycarbonate resin composition (or a molded article) to be nearly colorless after irradiation with ionizing radiation and can reduce deterioration in transparency. For example, the anthraquinone colorant may include a red anthraquinone colorant, a violet anthraquinone colorant, and combinations thereof.

In some embodiments, the anthraquinone colorant may include the red anthraquinone colorant and the violet anthraquinone colorant in a weight ratio of about 1:1 to about 1:2, for example, about 1:1.3 to about 1:1.7. Within this range of weight ratio, the polycarbonate resin composition can exhibit further improved properties in terms of color, transparency and the like after irradiation with ionizing radiation.

In some embodiments, the anthraquinone colorant may include solvent red 195 pigment red 177

1-(methylamino)anthraquinone, and the like.

In some embodiments, the violet anthraquinone colorant may include disperse violet 26

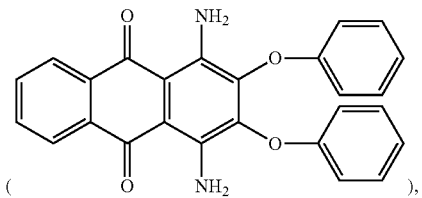 [SMILES: Nc1c(Oc2ccccc2)c(Oc2ccccc2)c(N)c2c1C(=O)c1ccccc1C2=O]

acid violet 34

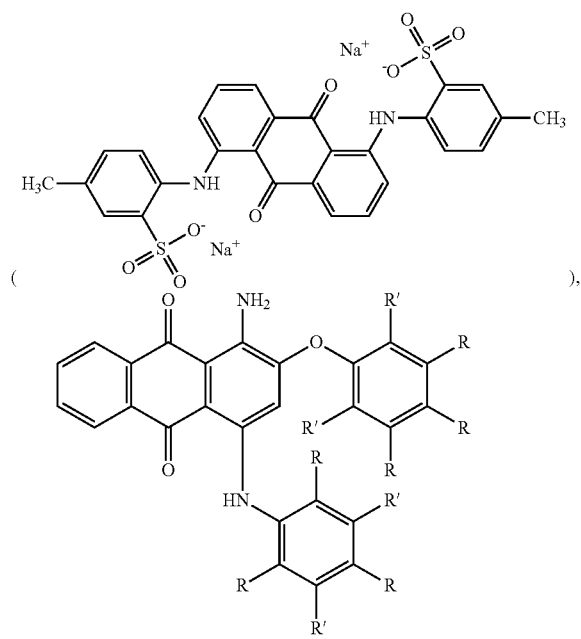

(wherein R is each independently a hydrogen atom, a methyl group, a tert-butyl group, or an isooctyl group, and R' is each independently a hydrogen atom or —SO₃Na), and the like.

In some embodiments, when the anthraquinone colorant is used, the anthraquinone colorant may be present in an amount of about 0.0001 to about 0.002 parts by weight, for example, about 0.0005 to about 0.0015 parts by weight, specifically about 0.0007 to about 0.0011 parts by weight, relative to about 100 parts by weight of the polycarbonate resin. Within this range, the polycarbonate resin composition can exhibit good properties in terms of color, transparency and the like after irradiation with ionizing radiation.

The polycarbonate resin composition according to the present invention may further include another resin without deteriorating advantageous effects of the present invention. For example, polyethylene terephthalate, polybutylene terephthalate, polyester polycarbonate, and the like may be further added to the polycarbonate resin composition, without being limited thereto. When the polycarbonate resin composition further includes these resins, these resins may be present in an amount of about 50 parts by weight or less, for example, about 1 part by weight to about 15 parts by weight, relative to about 100 parts by weight of the polycarbonate resin, without being limited thereto.

The polycarbonate resin composition may further include additives which are typically used in a resin composition. Examples of the additives may include fillers, a reinforcing agent, a stabilizer, a coloring agent, an antioxidant, an antistatic agent, a flow improver, a release agent, and a nucleation agent, without being limited thereto. When the additives are used, the additives may be present in an amount of about 25 parts by weight or less, for example, about 10 parts by weight or less, relative to about 100 parts by weight of the polycarbonate resin, without being limited thereto.

The polycarbonate resin composition may be prepared by a method for preparing a thermoplastic resin composition known in the art. For example, the polycarbonate resin composition may be prepared in pellet form by mixing the aforementioned components according to the present invention, and, optionally, other additives, followed by melt extrusion using an extruder or the like.

In one embodiment, the polycarbonate resin composition according to the present invention may have a yellow index (YI) of about −10 to about 10, for example, about −5 to about 5, as measured on an about 3.2 mm thick specimen in accordance with ASTM D1925 after irradiation with γ-rays at 25 kGy and leaving the specimen for 7 days.

In one embodiment, the polycarbonate resin composition according to the present invention may have a yellow index difference $\Delta YI$ of about 30 or less, for example, about 10 to about 29, as measured on an about 3.2 mm thick specimen and calculated according to Equation 1.

$$\Delta YI = YI_1 - YI_0 \quad \text{[Equation 1]}$$

In Equation 1, $YI_0$ is a yellow index (YI) of the specimen, as measured in accordance with ASTM D1925 before irradiation with γ-rays, and $YI_1$ is a yellow index (YI) of the specimen, as measured in accordance with ASTM D1925 after irradiation with γ-rays at 25 kGy and leaving the specimen for 7 days.

In one embodiment, the polycarbonate resin composition may have a notched Izod impact strength of about 90 kgf·cm/cm or more, for example, about 94 kgf·cm/cm to about 110 kgf·cm/cm, as measured on a ⅛" thick specimen in accordance with ASTM D256 after irradiation with γ-rays at 25 kGy and leaving the specimen for 7 days.

In one embodiment, the polycarbonate resin composition may have a tensile strength of about 620 MPa to about 700 MPa, for example, about 630 MPa to about 690 MPa, as measured on a 3.2 mm thick specimen in accordance with ASTM D638 after irradiation with γ-rays at 25 kGy and leaving the specimen for 7 days, and a flexural strength of about 910 MPa to about 960 MPa, for example about 920 MPa to about 950 MPa, as measured on a 3.2 mm thick specimen in accordance with ASTM D790 after irradiation with γ-rays at 25 kGy and leaving the specimen for 7 days.

A molded product according to the present invention may be fabricated (formed) from the ionizing radiation resistant polycarbonate resin composition by various molding methods, such as injection molding, extrusion molding, vacuum molding, casting, and the like. The molded product exhibits excellent properties in terms of color, impact resistance, stiffness (tensile strength, flexural strength, and the like), and the like even after irradiation with ionizing radiation. Thus, the molded product according to the present invention may be advantageously used in ionizing radiation resistant medical appliances including container-type packages for receiving or packing syringes, surgical instruments, intravenous injectors and surgical devices, components of medical devices, such as artificial lungs, artificial kidneys, anesthesia inhalers, vein couplers, hemodialyzers, hemofilters, safety syringes and accessories thereof, and components of blood centrifuges, surgical instruments, surgical instruments, intravenous injectors, and the like.

Mode for Invention

Next, the present invention will be described in more detail with reference to some examples. It should be understood that these examples are provided for illustration only and are not to be construed in any way as limiting the present invention.

Description of details apparent to those skilled in the art will be omitted for clarity.

EXAMPLE

Details of each component used in the following Examples and Comparative Examples are as follows:

(A) Polycarbonate Resin

A bisphenol A-type polycarbonate resin (CALIBRE 200-10, TRINSEO S.A., weight average molecular weight: 26,000 g/mol).

(B) Polycarbonate Polyol

A polycarbonate polyol containing: a hydroxyl group at both terminals thereof; a repeat unit represented by Formula 1c; and a repeat unit represented by Formula 1d (number average molecular weight (Mn): 2,000 g/mol, Formula 1c:Formula 1d (molar ratio)=50:50).

[Formula 1c]

$$-\!\!\!+\!\!\!O\!\!-\!\!(CH_2)_2\!\!-\!\!O\!\!-\!\!\overset{O}{\overset{\|}{C}}\!\!-\!\!\!+\!\!\!-$$

[Formula 1d]

$$-\!\!\!+\!\!\!O\!\!-\!\!(CH_2)_6\!\!-\!\!O\!\!-\!\!\overset{O}{\overset{\|}{C}}\!\!-\!\!\!+\!\!\!-$$

(C) Polyalkylene Glycol

Polypropylene glycol (number average molecular weight (Mn): 2,000 g/mol).

(D) Epoxy Ester Compound

A compound represented by Formula 2a

[Formula 2a]

(E) Anthraquinone Colorant (E1) A red anthraquinone colorant (solvent red 195

(E2) A violet anthraquinone colorant (disperse violet 26

)).

Examples 1 to 5 and Comparative Examples 1 and 2: Preparation and Evaluation of Polycarbonate Resin Composition As listed in Table 1, the (A) polycarbonate resin, the (B) polycarbonate polyol, the (C) polyalkylene glycol, the (D) epoxy ester compound, and the (E) anthraquinone colorant were blended, followed by extrusion using a twin-screw extruder (L/D=36, screw diameter=32 mm) at 280° C., thereby preparing a polycarbonate resin composition which was produced into pellets through a pelletizer. The pelletized polycarbonate resin composition was dried in an oven at 120° C. for 4 hours, followed by injection molding in an injection molding machine (DHC 120WD, Dongshin Hydraulics Co.) at a molding temperature (cylinder temperature) of 270° C. and a mold temperature of 70° C. to prepare a specimen. Properties of the prepared specimen were evaluated by the following methods, and results are shown in Table 1.

Property Evaluation (1) Yellow index (YI) after irradiation with γ-rays: Yellow index (YI) was measured on a 3.2 mm thick specimen in accordance with ASTM D1925 after irradiation with γ-rays at 25 kGy and leaving the specimen for 7 days.

(2) Yellow index difference (ΔYI) before and after irradiation with γ-rays: Yellow index difference (ΔYI) was calculated according to Equation 1.

$$\Delta YI = YI_1 - YI_0 \qquad \text{[Equation 1]}$$

In Equation 1, $YI_0$ is a yellow index (YI) of a 3.2 mm thick specimen, as measured in accordance with ASTM D1925 before irradiation with γ-rays, and $YI_1$ is a yellow index (YI) of the specimen, as measured in accordance with ASTM D1925 after irradiation with γ-rays at 25 kGy and leaving the specimen for 7 days.

(3) Notched Izod impact strength after irradiation with γ-rays (unit: kgf·cm/cm): Notched Izod impact strength was measured on a ⅛" thick specimen in accordance with ASTM D256 after irradiation with γ-rays at 25 kGy and leaving the specimen for 7 days.

(4) Tensile strength after irradiation with γ-rays (unit: MPa): Tensile strength was measured on a 3.2 mm thick specimen at a tensile rate of 50 mm/min in accordance with ASTM D638 after irradiation with γ-rays at 25 kGy and leaving the specimen for 7 days.

(5) Flexural strength after irradiation with γ-rays (unit: MPa): Flexural strength was measured on a 3.2 mm thick specimen at a bending rate of 2.8 mm/min in accordance with ASTM D790 after irradiation with γ-rays at 25 kGy and leaving the specimen for 7 days.

TABLE 1

| | Example | | | | | Comparative Example | |
|---|---|---|---|---|---|---|---|
| | 1 | 2 | 3 | 4 | 5 | 1 | 2 |
| (A) (parts by weight) | 100 | 100 | 100 | 100 | 100 | 100 | 100 |
| (B) (parts by weight) | 0.75 | 0.375 | 0.25 | 0.15 | 0.25 | — | — |
| (C) (parts by weight) | — | 0.375 | 0.5 | 0.6 | 0.5 | — | 0.75 |
| (D) (parts by weight) | — | — | — | — | 0.04 | — | — |
| (E) (E1) (parts by weight) | 0.0003 | 0.0003 | 0.0003 | 0.0003 | 0.0003 | 0.0003 | 0.0003 |
| (E2) | 0.00055 | 0.00055 | 0.00055 | 0.00055 | 0.00055 | 0.00055 | 0.00055 |
| Yellow index (YI) after irradiation with γ-rays | 3.9 | 2.4 | 1.9 | 1.5 | −4.5 | 32 | −0.5 |
| Yellow index difference (Δ YI) before and after irradiation with γ-rays | 28.9 | 27.4 | 26.9 | 26.5 | 20.5 | 57 | 24.5 |
| Notched Izod impact strength after irradiation with γ-rays | 100 | 97 | 96 | 94 | 97 | 97 | 85 |
| Tensile strength after irradiation with γ-rays | 660 | 650 | 640 | 640 | 640 | 660 | 600 |
| Flexural strength after irradiation with γ-rays | 940 | 930 | 930 | 930 | 930 | 940 | 900 |

As shown in Table 1, it can be seen that the polycarbonate resin composition according to the present invention exhibited good properties in terms of discoloration resistance (yellow index difference), impact resistance, and stiffness (tensile strength and flexural strength) even after irradiation with ionizing radiation.

Conversely, the polycarbonate resin composition of Comparative Example 1, free from the polycarbonate polyol, the polyalkylene glycol, and the epoxy ester compound, had a yellow index difference of greater than 30, as measured after irradiation with ionizing radiation (γ-rays) and thus exhibited poor properties in terms of color (discoloration resistance) after irradiation with ionizing radiation, and the polycarbonate resin composition of Comparative Example 2, free from the polycarbonate polyol, exhibited poor properties in terms of impact resistance and stiffness after irradiation with ionizing radiation (γ-rays), as compared with those of Examples.

It should be understood that various modifications, changes, alterations, and equivalent embodiments can be made by those skilled in the art without departing from the spirit and scope of the invention.

The invention claimed is:

1. A polycarbonate resin composition, comprising:
   a polycarbonate resin; and
   about 0.1 parts by weight to 0.375 parts by weight relative to about 100 parts by weight of the polycarbonate resin of a polycarbonate polyol having a number average molecular weight of about 1,000 g/mol to about 5,000 g/mol and containing terminal hydroxyl groups; a repeat unit represented by Formula 1a; and a repeat unit represented by Formula 1b:

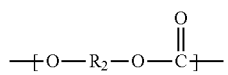

[Formula 1a]

where $R_2$ is a $C_1$ to $C_4$ linear alkylene group or a $C_3$ to $C_4$ branched alkylene group; and

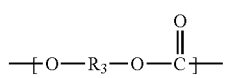

[Formula 1b]

where $R_3$ is a $C_5$ to $C_{15}$ linear alkylene group, a $C_5$ to $C_{15}$ branched alkylene group, or a $C_5$ to $C_{15}$ cyclic alkylene group.

2. The polycarbonate resin composition according to claim 1, wherein the repeat unit represented by Formula 1a is present in an amount of about 1 mol % to about 99 mol % based on the total mole number of the repeat units represented by Formula 1a and Formula 1b, respectively, and the repeat unit represented by Formula 1b is present in an amount of about 1 mol % to about 99 mol % based on the total mole number of the repeat units represented by Formula 1a and Formula 1b, respectively.

3. The polycarbonate resin composition according to claim 1, further comprising: at least one of a polyalkylene glycol; an epoxy ester compound represented by Formula 2; and an anthraquinone colorant:

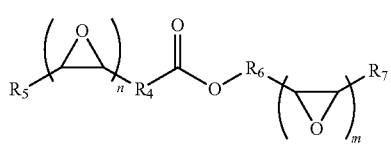

[Formula 2]

where $R_4$ and $R_6$ are each independently a $C_1$ to $C_{10}$ hydrocarbon group, $R_5$ and $R_7$ are each independently a hydrogen atom or a $C_1$ to $C_{10}$ hydrocarbon group, m and n are 0 or 1, and m+n is 1 or 2, wherein $R_4$ and $R_5$ and/or $R_6$ and $R_7$ are optionally connected to form a ring.

4. The polycarbonate resin composition according to claim 3, wherein, relative to about 100 parts by weight of the polycarbonate resin, the polyalkylene glycol is present in an amount of about 0.1 parts by weight to about 1.5 parts by weight, the epoxy ester compound is present in an amount of about 0.001 parts by weight to about 3 parts by weight, and the anthraquinone colorant is present in an amount of about 0.0001 parts by weight to about 0.002 parts by weight.

5. The polycarbonate resin composition according to claim 3, wherein the anthraquinone colorant comprises a red anthraquinone colorant and a violet anthraquinone colorant in a weight ratio of about 1:1 to about 1:2.

6. The polycarbonate resin composition according to claim 1, wherein the polycarbonate resin composition has a yellow index (YI) of about −10 to about 10, as measured on an about 3.2 mm thick specimen in accordance with ASTM D1925 after irradiation with γ-rays at 25 kGy and leaving the specimen for 7 days.

7. The polycarbonate resin composition according to claim 1, wherein the polycarbonate resin composition has a yellow index difference ΔYI of about 30 or less, as measured on an about 3.2 mm thick specimen and calculated according to Equation 1:

$$\Delta YI = YI_1 - YI_0 \quad [\text{Equation 1}]$$

where $YI_0$ is a yellow index (YI) of the specimen, as measured in accordance with ASTM D1925 before irradiation with γ-rays, and $YI_1$ is a yellow index (YI) of the specimen, as measured in accordance with ASTM D1925 after irradiation with γ-rays at 25 kGy and leaving the specimen for 7 days.

8. The polycarbonate resin composition according to claim 1, wherein the polycarbonate resin composition has a notched Izod impact strength of about 90 kgf·cm/cm or more, as measured on a ⅛" thick specimen in accordance with ASTM D256 after irradiation with γ-rays at 25 kGy and leaving the specimen for 7 days.

9. The polycarbonate resin composition according to claim 1, wherein the polycarbonate resin composition has a tensile strength of about 620 MPa to about 700 MPa, as measured on a 3.2 mm thick specimen in accordance with ASTM D638 after irradiation with γ-rays at 25 kGy and leaving the specimen for 7 days, and a flexural strength of about 910 MPa to about 960 MPa, as measured on a 3.2 mm thick specimen in accordance with ASTM D790 after irradiation with γ-rays at 25 kGy and leaving the specimen for 7 days.

10. A molded article formed of the polycarbonate resin composition according to claim 1.

11. The molded article according to claim 10, wherein the molded article is an ionizing radiation-resistant medical appliance.

12. The polycarbonate resin composition according to claim 1, wherein the polycarbonate resin composition has a yellow index (YI) of about −10 to about 10, as measured on an about 3.2 mm thick specimen in accordance with ASTM D1925 after irradiation with γ-rays at 25 kGy and leaving the specimen for 7 days; a yellow index difference ΔYI of about 30 or less, as measured on an about 3.2 mm thick specimen and calculated according to Equation 1:

$$\Delta YI = YI_1 - YI_0 \quad [\text{Equation 1}]$$

where $YI_0$ is a yellow index (YI) of the specimen, as measured in accordance with ASTM D1925 before irradiation with γ-rays, and $YI_1$ is a yellow index (YI) of the specimen, as measured in accordance with ASTM D1925 after irradiation with γ-rays at 25 kGy and leaving the specimen for 7 days; and a notched Izod impact strength of about 90 kgf·cm/cm or more, as measured on a ⅛" thick specimen in accordance with ASTM D256 after irradiation with γ-rays at 25 kGy and leaving the specimen for 7 days.

13. The polycarbonate resin composition according to claim 1, wherein $R_2$ of Formula 1b is an ethylene group and $R_3$ of Formula 1c is a hexylene group.

14. The polycarbonate resin composition according to claim 1, further comprising a polyalkylene glycol and an anthraquinone colorant.

15. The polycarbonate resin composition according to claim 14, wherein the anthraquinone colorant comprises a red anthraquinone colorant and a violet anthraquinone colorant in a weight ratio of about 1:1 to about 1:2.

16. The polycarbonate resin composition according to claim 15, further comprising an epoxy ester compound.

* * * * *